(No Model.)
J. J. HOLLAND.
COTTON CHOPPER AND CULTIVATOR.
No. 605,426. Patented June 7, 1898.
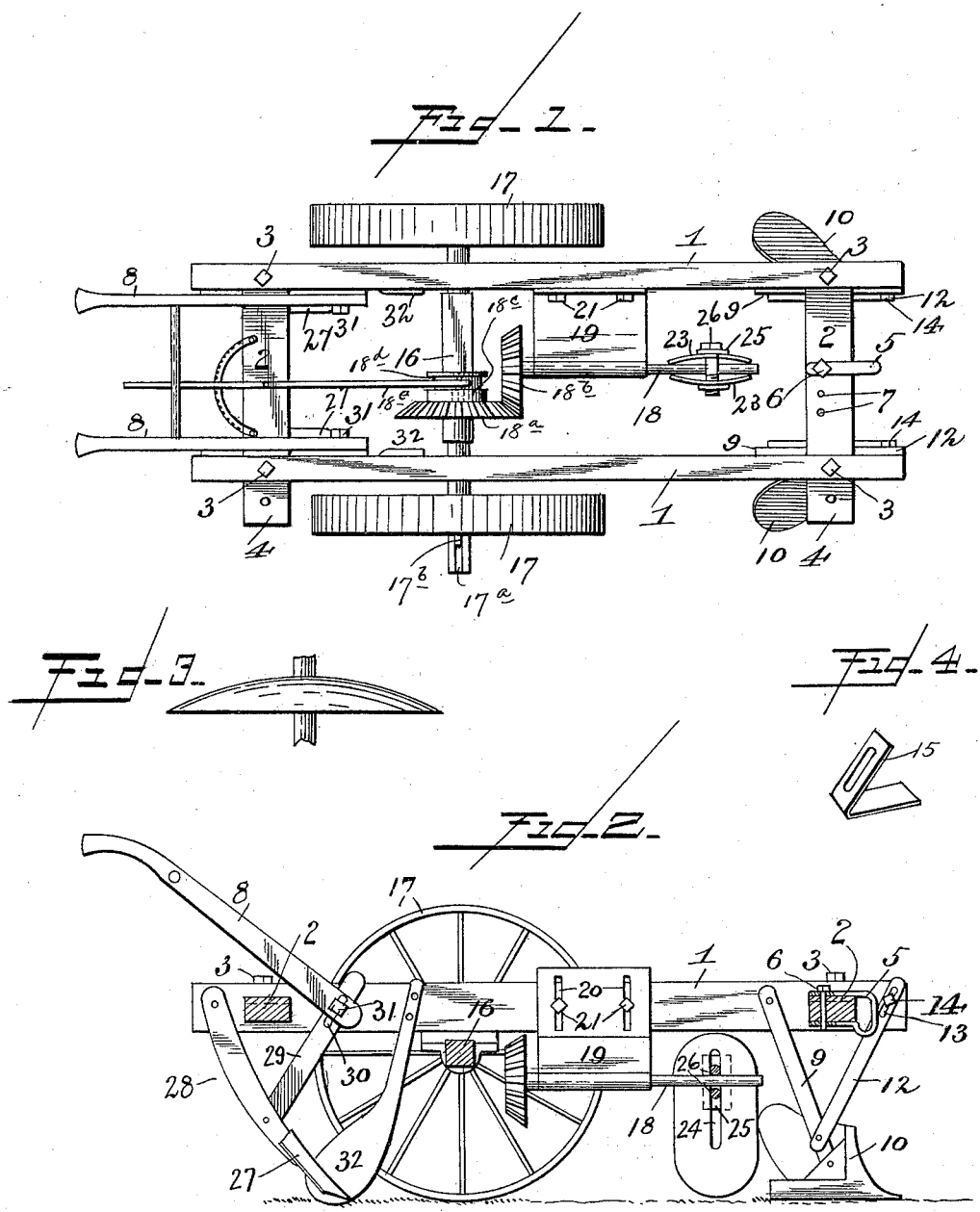
Witnesses
F. L. Ourand
Jos. L. Coombs
Inventor
Joseph J. Holland,
by Louis Bagger & Co.
Attorneys

UNITED STATES PATENT OFFICE.

JOSEPH J. HOLLAND, OF EDGE, TEXAS, ASSIGNOR OF ONE-HALF TO HENRY MITCHELL, OF WHEELOCK, TEXAS.

COTTON CHOPPER AND CULTIVATOR.

SPECIFICATION forming part of Letters Patent No. 605,426, dated June 7, 1898.

Application filed April 5, 1897. Serial No. 630,837. (No model.)

*To all whom it may concern:*

Be it known that I, JOSEPH J. HOLLAND, a citizen of the United States, and a resident of Edge, in the county of Brazos and State of Texas, have invented certain new and useful Improvements in Cotton Choppers and Cultivators; and I do hereby declare that the following is a full, clear, and exact description of the invention, which will enable others skilled in the art to which it appertains to make and use the same, reference being had to the accompanying drawings, which form a part of this specification.

My invention relates to cotton choppers and cultivators; and its object is to provide an improved construction of the same which shall possess superior advantages with respect to efficiency in use.

The invention consists in the novel construction and combination of parts hereinafter fully described and claimed.

In the accompanying drawings, Figure 1 is a plan view of a cotton chopper and cultivator constructed in accordance with my invention. Fig. 2 is a longitudinal sectional view of the same. Fig. 3 is a detail view showing a modification. Fig. 4 is a perspective view of the adjustable plow-guide.

In the said drawings the reference-numeral 1 designates the plow-beams, consisting of two parallel horizontal beams provided with holes or apertures near each end, through which pass the cross-beams 2, which are secured in place by means of set-screws 3.

It will be seen that the ends of the cross-beams which pass through the side beams are reduced for such purpose, and the ends at one side, as seen in Fig. 1, project beyond said side beam, forming extensions 4, the purpose of which is to allow the side beam at the side to be adjusted laterally, so as to vary the distance between it and the opposite beam.

The numeral 5 designates a clevis, which is connected with the front cross-beam by means of a pin 6, which passes through one of a series of holes 7 in said beam.

Connected with the side beams 1, near the rear end, are handles 8. Pivoted to the said side beams, near the front thereof, are plow-standards 9, to which are secured the plows or cultivator-shovels 10. Pivoted to these standards, intermediate their ends, are inclined brace-bars 12, having slots 13 at the upper ends, through which pass set-screws 14, engaging with the side beams. By loosening these screws and moving the bars 12 up or down the plows may be adjusted so as to vary the depth of cut.

The numeral 15 designates vertically-adjustable guides connected with the rear sides of the standards.

The numeral 16 designates the axle, made angular between the ends and provided with wheels 17, one of which is adjustable laterally on said axle. Said axle is formed with a longitudinal groove 17$^a$ and the wheel provided with a rib or feather 17$^b$ to permit of such lateral adjustment of the wheel. Mounted on the squared portion of the axle is a laterally-adjustable bevel-gear 18$^a$, which meshes with a corresponding gear 18$^b$ on the rear end of a shaft 18. The gear 18$^a$ is provided with a hub 18$^c$, formed with a peripheral groove 18$^d$, with which engages one end of a lever 18$^e$, by which the gear is thrown into and out of mesh with the gear 18$^b$ as the latter is adjusted vertically. The shaft 18 is journaled in the lower end of a plate 19, having its upper end turned over at an angle and formed with slots 20, through which pass set-screws 21, engaging with one of the side beams. The front end of said shaft is provided with adjustable choppers 23, having slots 24, and through these slots and also through clamping-plates 25 pass screws 26, by which said choppers are clamped to the shaft. By loosening said screws the choppers may be adjusted to regulate the depth of cut.

At the rear of the side beams are the rear plows 27, secured to the standards 28, pivoted to the rear ends of the side beams, and connected with said side beams are inclined brace-bars 29, having slots 30, through which pass the set-screws 31, which connect the handles 8 to said beams.

Located at the inner sides of the rear plows are fenders 32, which serve to prevent the earth from being thrown over on the growing plants.

In use the side bars are adjusted according to the width between the rows by removing the set-screws 3 and moving one of the bars in or out, as the case may be. The adjustable wheel is also moved in or out to correspond with the movement of the side bar, which adjustment is permitted by means of the groove in the axle and the rib or feather on the wheel. The plate to which the shaft 18 is journaled is also adjusted vertically, the bevel-gear $18^a$ being moved laterally on the axle to correspond with such adjustment and yet be kept in mesh with gear $18^b$. The choppers 23 may also be adjusted by loosening the screws 26.

Instead of the plows shown in Fig. 2 the disk-plows shown in Fig. 3 may be used.

Having thus fully described my invention, what I claim is—

In a cotton-chopper, the combination with the transverse beams, the side beams one of which is laterally adjustable, the axle, the wheels, one of which is laterally adjustable, and the adjustable bevel-gear on said axle and means for adjusting the same, of the slotted plate, the set-screws for securing it to one of the side beams, the shaft journaled thereto, the bevel-gear at the rear end meshing with the adjustable bevel-gear, the choppers, at the front end of said shaft, formed with slots, the clamping-plates and the set-screws passing through said slots and through the clamping-plates, substantially as described.

In testimony that I claim the foregoing as my own I have hereunto affixed my signature in presence of two witnesses.

JOSEPH J. HOLLAND.

Witnesses:
MARSH MITCHELL,
W. G. CURRY.